March 29, 1960 R. C. WOLCOTT ET AL 2,931,025

DATA HANDLING CIRCUIT

Filed Dec. 30, 1957

INVENTORS
Ralph C. Wolcott and
Harry R. Lord

BY Geoffrey Knight
ATTORNEY

United States Patent Office
2,931,025
Patented Mar. 29, 1960

2,931,025

DATA HANDLING CIRCUIT

Ralph C. Wolcott, Whitney Point, and Harry R. Lord, Endicott, N.Y., assignors to International Business Machines Corporation, New York, N.Y., a corporation of New York Application December 30, 1957, Serial No. 705,966

6 Claims. (Cl. 340—347)

This invention relates to data handling circuits.

One object of the invention is to provide a circuit which can be combined with other circuit units to provide a single output in response to plural inputs.

Another object is to provide a circuit unit of the type just described which will recognize sign control.

A more particular object is to provide a digital-to-analogue converter which will accept a digital number representation in terms of its several digits and convert it into a single representation in its analogue form.

The digital-to-analogue converter is well known in its general form but such converters in general preform this function with the aid of complex electronic apparatus containing precision circuit elements. Such a converter because of its complexity and use of precision circuit elements is not completely reliable and is at times not economical to build.

It is therefore another object of this invention to convert information from its digital-to-analogue form.

It is a still further object of this invention to provide a device of the kind described having a high degree of reliability.

It is yet another object of this invention to provide a device of the kind described which is simple and economical to construct.

Other objects of the invention will be pointed out in the following description and claims and illustrated in the accompanying drawings which disclose, by way of example, the principle of the invention and the best mode which has been contemplated of applying that principle.

The invention as it is described in one embodiment will be seen to present a digital-to-analogue converter using standard components and a minimum of circuitry. This embodiment uses a magnetic amplifier which can be any commercially available magnetic amplifier having multiple control windings and which will permit the output to be converted to a variable amplitude, reversible phase alternating current. The diodes used are not critical, but only need a high front to back ratio. The resistors used may be any available resistors which have the proper relation to each other. The latches may be either mechanical or electronic latches which can be switched to two different potential states upon receiving a signal. Obviously for faster operation electronic latches will be used.

Figure 1:
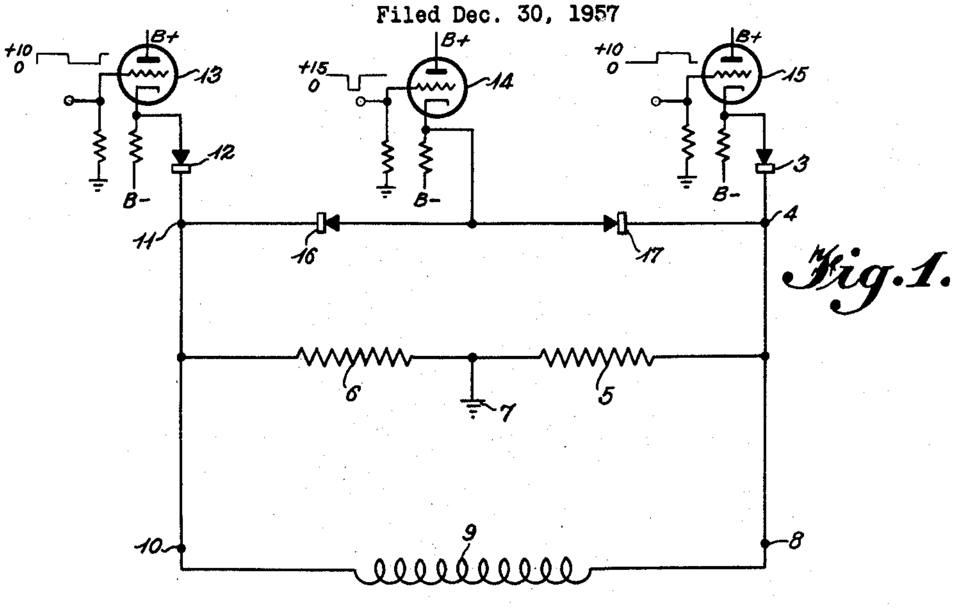
Fig. 1 is a schematic diagram of a basic circuit unit of one embodiment of this invention.

Referring first to Fig. 1, there is shown a control winding 9 of a magnetic amplifier connected to two sign latches 13 and 15 through respective diodes 3 and 12, and to a bit latch 14 through diodes 16 and 17 as shown in the circuit diagram. The latches 13–15 shown in the diagram are cathode followers which are well known in the art. They are shown merely to illustrate an electronic latch which may be used and the invention is not limited to their use. A ground potential point 7 is connected in the circuit through equal resistors 5 and 6 as shown in the circuit diagram. The sign latches have two conditions, a positive potential, in this case plus ten volts, and a ground potential, with one latch in one condition while the other latch is in the other condition. The sign latches represent the sign of the number to be converted. There is shown only one bit latch, so only one number may be represented by this circuit as illustrated. The bit latch 14 has two conditions, a ground potential, and a positive voltage potential greater than the positive voltage potential of the sign latch, in this case fifteen volts.

In the case of the bit latch ground potential indicates a digit, and in the case of the sign latches plus ten volts represents the sign to be represented. For this discussion, sign latch 15 in its positive voltage condition will represent a negative number, and sign latch 13 in its positive voltage condition will represent a positive number.

For illustration assume we want to represent a positive digit. Then sign latch 13 will have a plus ten volts potential and sign latch 15 a ground potential. Normally without the representation of a digit, bit latch 14 will be at a plus fifteen volts. With bit latch 14 at fifteen volts points 11 and 4 will be at fifteen volts, blocking diode 12, and points 8 and 10 will be at equal potentials, so no current will flow through winding 9, but current will flow through resistors 5 and 6 to ground. When a digit is to be represented bit latch 14 is switched to a ground potential. The blocking potential has thus been removed from diode 12, and the potential at point 11 is now plus ten volts, with a lower potential at point 4. Diodes 16 and 17 block current from flowing from sign latch 13 to the ground potential of bit latch 14. There will be a current path through resistor 6 to ground, but this may be neglected for the purpose of this explanation. The potential at point 8 is now less than that at point 10, so current will flow through control winding 9, and through the resistor 5 to ground. The current flowing through the control winding will be determined by the resistor 5. The output from the magnetic amplifier therefore represents the presence of a digit. This output may be utilized to control such analogue devices as synchros, servos, and the like. When the bit latch 14 is switched back to plus fifteen volts the current through the control winding 9 is cut off until a digit is again represented by the switching of bit latch 14 to ground potential.

To represent a negative number sign latches 13 and 15 are reversed, with sign latch 15 at ten volts and sign latch 13 at ground potential. Then when bit latch 14 is switched to ground potential, point 10 will be at a lower potential than point 8, and current will flow from sign latch 15, through point 8, control winding 9, point 10, and resistor 6 to ground. Again the current from sign latch 15, through resistor 5 to ground may be neglected. The current has flowed through the opposite direction of the control winding, reversing the phase by 180° of the magnetic amplifier, and the indication from the magnetic amplifier is opposite from that when sign latch 13 was at plus ten volts potential, and sign latch 15 was at ground potential. It is obvious that the polarity of the voltage sources may be reversed with corresponding polarity changes of all of the diodes, and the invention will not be changed.

Figure 2:
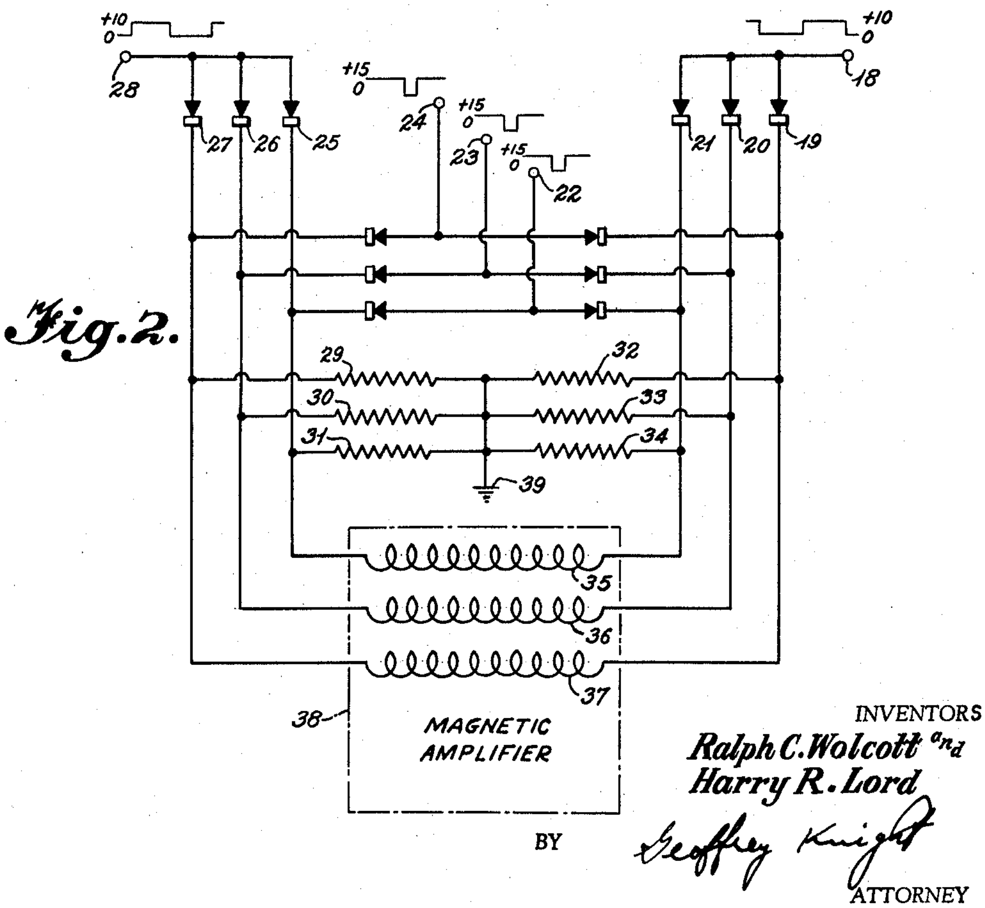
Fig. 2 is a complete schematic diagram of the embodiment of this invention shown in Fig. 1.

Fig. 2 shows three control windings 35–37 in a magnetic amplifier 38, and three bit latches 22–24. Using the binary number system, bit latch 22 will represent one, bit latch 23 will represent two, and bit latch 24 will represent four. The circuit operation is basically the same as that shown in Fig. 1 except that with the addition of two more bit latches and two more control windings different binary numbers may be converted into analogue form. The latches used may be cathode followers as shown in Fig. 1 or any other available electronic or mechanical latch.

Again the sign latches 18 and 28 have two alternative conditions, with one sign latch at plus ten volts while the other sign latch is at ground. Assume that sign latch 28 at plus ten volts and sign latch 18 at ground potential represents a positive number, with the opposite conditions representing a negative number. Bit latches 22–24 each have two conditions, plus fifteen volts and ground, and when all three are at plus fifteen volts, the potential from sign latch 28 is blocked, the potential is the same on both ends of the control windings 35–37, and no current flows through the control windings 35–37.

The three control windings are equal, but the resistors are weighted so that when the bit latches 22–24 are at ground potential, and current flows from the sign latch 28, through the diodes 25–27, through the control windings 35–37, through the resistors 32–34 to ground 39, the current through the control windings 35–37 is proportional to which bit latches 22–24 are at ground potential. Resistors 29 and 32 are weighted so a representation of one is presented when bit latch 22 is on, resistors 30 and 33 are weighted so a representation of two is presented when bit latch 23 is on, and resistors 31 and 34 are weighted so a representation of four is presented when bit latch 24 is on. In referring to "on" in relation to bit latches this means the bit latch is at ground potential. It is therefore obvious that when the bit latches 22–24 are all on, current flows through control windings 35–37 presenting a summation of seven. The inductances in the control windings are in effect added in the magnetic amplifier and the output from the magnetic amplifier is a representation of the bit latches which are on. Thus by using three bit latches, two sign latches, the three control windings and associated circuitry, any digital number from one to seven may be represented in analogue form as an output from the magnetic amplifier.

This analogue output may be used as a visual indication, or to control such analogue devices as servo-mechanisms, synchros and the like.

The conversion of information from its digital-to-analogue form is thus accomplished with standard components which are readily available, economical, and very reliable. Obviously the number of control windings and bit latches which may be utilized is a matter of choice. Also if it is not necessary to represent positive and negative digital numbers, the two sign latches may be done away with and a steady positive potential applied in place of one of the sign latches. The voltages used are obviously not limited to those used in this embodiment of the invention, but so long as the potential from the bit latches is at least as great as that from the sign latches it will block current flow from the sign latches. Note that the control windings of the magnetic amplifier are equal, and that only the resistors are changed to represent the different digits.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An electrical circuit including a coil, a power source, parallel resistance means for connecting the opposite ends of said coil to a first point of said power source, means for connecting a second point of said power source to one end of said coil, a pair of diodes, means electrically connecting one pair of like terminals of said diodes to each other, means connecting the other pair of like terminals of said diodes to opposite ends of said coil respectively, and means connecting the mutually connected terminals of said diodes to a point of said power source having a voltage which differs from the voltage of said first point by an amount at least as great as the difference of the voltage between said first and second points, whereby the effect on said coil of the voltage at said second point is suppressed, and means to change the voltage on said mutually connected terminals of said diodes to unsuppress the voltage of said second point.

2. An electrical circuit including a coil, a power source, parallel resistance means for connecting the opposite ends of said coil to a first point of said power source, means for alternatively connecting a second point of said power source to opposite ends of said coil, a pair of diodes, means electrically connecting one pair of like terminals of said diodes to each other, means connecting the other pair of like terminals of said diodes to opposite ends of said coil respectively, and means connecting the mutually connected terminals of said diodes to a point of said power source having a voltage which differs from the voltage of said first point by an amount at least as great as the difference of the voltage between said first and second points, whereby the effect on said coil of the voltage at said second point is suppressed, and means to change the voltage on said mutually connected terminals of said diodes to unsuppress the voltage of said second point.

3. In an electrical circuit network in combination with a power source, a plurality of circuit means, each including a coil, parallel resistance means for connecting the opposite ends of said coil to a first point of said power source, means for connecting a second point of said power source to one end of said coil, a pair of diodes, means electrically connecting one pair of like terminals of said diodes to each other, means connecting the other pair of like terminals of said diodes to opposite ends of said coil respectively, and means connecting the mutually connected terminals of said diodes to a point of said power source having a voltage which differs from the voltage of said first point by an amount at least as great as the difference of the voltage between said first and second points, whereby the effect on said coil of the voltage at said second point is suppressed and means to change the voltage on said mutually connected terminals of said diodes to unsuppress the voltage of said second point, the coils of all of said circuit means being physically associated to couple their magnetic fields.

4. In an electrical circuit network in combination with a power source, a plurality of circuit means, each including a coil, parallel resistance means for connecting the opposite ends of said coil to a first point of said power source, means for alternatively connecting a second point of said power source to opposite ends of said coil, a pair of diodes, means electrically connecting one pair of like terminals of said diodes to each other, means connecting the other pair of like terminals of said diodes to opposite ends of said coil respectively, and means connecting the mutually connected terminals of said diodes to a point of said power source having a voltage which differs from the voltage of said first point by an amount at least as great as the difference of the voltage between said first and second points, whereby the effect on said coil of the voltage at said second point is suppressed and means to change the voltage on said mutually connected terminals of said diodes to unsuppress the voltage of said second point, the coils of all of said circuit means being physically associated to couple their magnetic fields.

5. A digital number converter consisting of a power source, a plurality of circuit means, each including a coil, parallel resistance means for connecting the opposite ends of said coil to a first point of said power source, means for connecting a second point of said power source to one end of said coil, a pair of diodes, means electrically connecting one pair of like terminals of said diodes to each other, means connecting the other pair of like terminals of said diodes to opposite ends of said coil respectively, and means connecting the mutually connected terminals of said diodes to a point of said power source having a voltage which differs from the voltage of said first point by an amount at least as great as the difference of the voltage between said first and second points, whereby the effect on said coil of the voltage at said second point is suppressed, and means to change the voltage on said mutually connected terminals of said diodes to unsuppress the voltage of said second point, each pair of said resistance means having a conductivity which bears such a relation to that of the remainder as to form a series of resistance means, the conductivity of which increases in a geometric progression whose common ratio is two, each of said circuits therefore representing a digit of a binary number, the voltage of said second point of each of said circuit means being unsuppressed when the digit represented by each of said circuit means is to be presented, the coils of all of said circuit means being physically associated to couple their magnetic fields, the summation of said magnetic fields being proportional to the binary number presented.

6. A digital number converter consisting of a power source, a plurality of circuit means, each including a coil, parallel resistance means for connecting the opposite ends of said coil to a first point of said power source, means for alternatively connecting a second point of said power source to opposite ends of said coil, a pair of diodes, means electrically connecting one pair of like terminals of said diodes to each other, means connecting the other pair of like terminals of said diodes to opposite ends of said coil respectively, and means connecting the mutually connected terminals of said diodes to a point of said power source having a voltage which differs from the voltage of said first point by an amount at least as great as the difference of the voltage between said first and second points, whereby the effect on said coil of the voltage at said second point is suppressed, and means to change the voltage on said mutually connected terminals of said diodes to unsuppress the voltage of said second point, each pair of said resistance means having a conductivity which bears such a relation to that of the remainder as to form a series of resistance means, the conductivity of which increases in a geometric progression whose common ratio is two, each of said circuits therefore representing a digit of a binary number, the voltage of said second point of each of said circuit means being unsuppressed when the digit represented by each of said circuit means is to be presented, the coils of all of said circuit means being physically associated to couple their magnetic fields, the summation of said magnetic fields being proportional to the binary number presented.

References Cited in the file of this patent

UNITED STATES PATENTS

| | | |
|---|---|---|
| 2,454,781 | Deakin | Nov. 30, 1948 |
| 2,829,248 | Oberbeck | Apr. 1, 1958 |